United States Patent [19]

Fujihara et al.

[11] Patent Number: 4,957,036
[45] Date of Patent: Sep. 18, 1990

[54] GRILLES FOR AIR CONDITIONER

[75] Inventors: Kazuo Fujihara; Takahiro Komori, both of Inazawa, Japan

[73] Assignee: Toyoda Gosei Co., Ltd., Nishikasugai, Japan

[21] Appl. No.: 381,318

[22] Filed: Jul. 18, 1989

[30] Foreign Application Priority Data

| Jul. 27, 1988 | [JP] | Japan | 63-99692[U] |
| Oct. 28, 1988 | [JP] | Japan | 63-141824[U] |
| Nov. 8, 1988 | [JP] | Japan | 63-145804[U] |
| Jan. 23, 1989 | [JP] | Japan | 1-6164[U] |

[51] Int. Cl.$^5$ .............................................. B60H 1/34
[52] U.S. Cl. .......................................... 98/2; 98/40.24; 98/40.27
[58] Field of Search ............... 98/2, 40.24, 40.26, 98/40.27, 110, 121.2

[56] References Cited

U.S. PATENT DOCUMENTS

| 2,735,351 | 2/1956 | Abrahamsen | 98/40.26 |
| 3,177,797 | 4/1965 | Kennedy | 98/40.24 |
| 4,665,804 | 5/1987 | Miyasaka | 98/2 |

FOREIGN PATENT DOCUMENTS 2200526 7/1973 Fed. Rep. of Germany ..... 98/40.27

Primary Examiner—Harold Joyce
Attorney, Agent, or Firm—Cushman, Darby & Cushman

[57] ABSTRACT

A grille for air conditioning to be mounted on an installation panel provided inside an automobile, whose structure comprises a main body, a plurality of flexible wind deflecting plates provided inside the main body and supported at their rear end portions by the same main body, a plurality of wind deflecting plates provided in front of the above-mentioned flexible wind deflecting plates, arranged in a direction perpendicular to that of the flexible wind deflecting plates, an operating piece that slides through one of the front wind deflecting plates, and grooves that engage with the front end portions of the rear wind deflecting plates, the grooves being located on the rear end portion of the operating piece.

13 Claims, 4 Drawing Sheets

GRILLES FOR AIR CONDITIONER

BACKGROUND OF THE INVENTION

1. Field of the Invention

The present invention relates to grilles for air conditioning furnished in car interiors, and others.

2. Description of the Related Art

One of the commonly known grilles for air conditioning in car interiors is one provided mainly on an installation panel (Japanese Utility Model Laid-open No. 51-2849). In this grille for air conditioning, the wind deflecting plates are made of flat springs, these wind deflecting plates being made to form circular arcs as they are mounted inside a case. By applying pressure on these wind deflecting plates by means of an operating lever, the arcing direction of the wind deflecting plates can be made to vary from left to right, thus changing the direction of the wind coming source.

As an example of this kind of wind deflecting plate, there is a type wherein a V-shaped slit is formed at equal intervals on the upper and lower surfaces of a wind deflecting plate to make this wind deflecting plate easier to bend (Japanese Utility Model Laid-open No. 51-6643).

However, in the common grille for air conditioning mentioned above, in order to change the direction of the wind by making the wind deflecting plates curve using the operating lever, a considerable amount of operating force is needed due to the position of the operating lever and to the elastic forces of the wind deflecting plates. Also, when the wind deflecting plates are made to curve, since these same wind deflecting plates are flexible, there have been cases where they became twisted or distorted.

Further, when the strength and stiffness of each of the elements used, or the precision of the bearings was increased in order to solve the above-mentioned problems, the weight of the entire grille for air conditioning was increased and the manufacturing cost became high.

Again, in the common grille for air conditioning mentioned above, aside from the fact that the structure was complicated, there have been cases where the arcing of the wind deflecting plates was not smooth. Moreover, since the end portions of the wind deflecting plates that correspond to the wind source were not in the same direction as that of the wind coming in, there was the problem of noise being generated when an especially strong wind was being blown.

Also, when the force from the operating lever for changing the direction of the wind was not transmitted evenly on the entire set of wind deflecting plates, there have been problems wherein these wind deflecting plates became twisted, causing a disturbance in the orderly flow of the wind. Because of this, an air eddy was produced, which, in turn, produced noise, and the direction of the wind became uneven. Also, there have been cases where noise was generated and an uneven flow of air arose due to the irregularity of the slits on the wind deflecting plates.

SUMMARY OF THE INVENTION

An object of the present invention is to provide grilles for air conditioning wherein the wind deflecting plates curve in smooth circular arcs, the flow of air is smooth and even, and the generation of noise is minimized when a specially strong wind is being blown.

Another object of the present invention is to provide grilles for air conditioning wherein the strength of the wind deflecting plates is sufficiently maintained, and the wind deflecting plates can be easily made to curve in a prescribed direction with a light operating force on an operating piece.

A further object of the present invention is to provide grilles for air conditioning that is easy to manufacture, easy to install, and wherein the manufacturing cost is minimized.

In order to realize the objects mentioned above, the present invention employs a structure wherein the present invention comprises a main body, a plurality of flexible wind deflecting plates whose rear end portions are supported by the main body, these wind deflecting plates being provided inside the same main body, a plurality of wind deflecting plates provided in front of the flexible wind deflecting plates, these wind deflecting plates being arranged in a direction perpendicular to that of the flexible wind deflecting plates, an operating piece that slides through one of the front wind deflecting plates, and grooves provided on the rear end portion of the operating piece, said grooves engaging with the front end portions of the rear wind deflecting plates.

Other and further objects of the present invention will become obvious with an understanding of the illustrative embodiments about to be described and as will be indicated in the appended claims, and various advantages not referred to herein will occur to one skilled in the art upon employment of the invention in practice.

BRIEF DESCRIPTION OF THE DRAWINGS

FIG. 1 is a side sectional view showing a grille for air conditioning;

FIG. 2 is a plane sectional view showing a grille for air conditioning; and

FIG. 3 is an enlarged partial view showing the main parts of a grille for air conditioning.

FIG. 5 is a plane sectional view showing the wind deflecting plates in their curved state;

FIG. 6 is an exploded perspective view of a grille for air conditioning; and

FIG. 7 is a perspective view of a grille for air conditioning.

DETAILED DESCRIPTION OF THE PREFERRED EMBODIMENTS

[First Embodiment]

A first embodiment exemplifying a grille for air conditioning of the present invention as provided on an installation panel furnished an automobile is described below with reference to FIG. 1 to FIG. 3.

Figure 1:
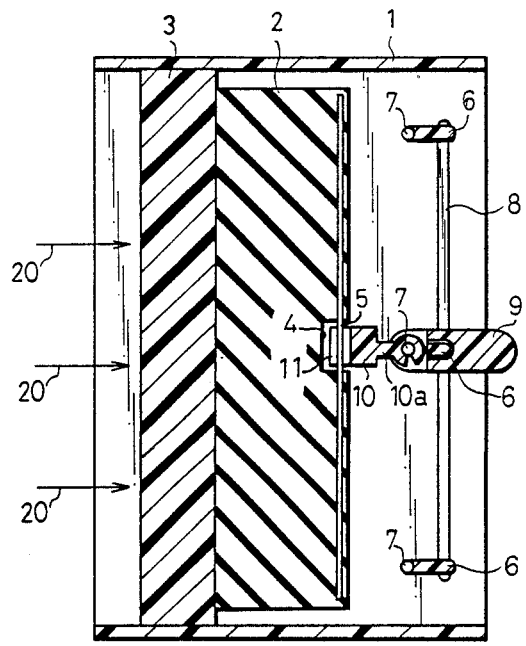
FIG. 1 to FIG. 3 are illustrations showing the first embodiment of the present invention.
Figure 2:
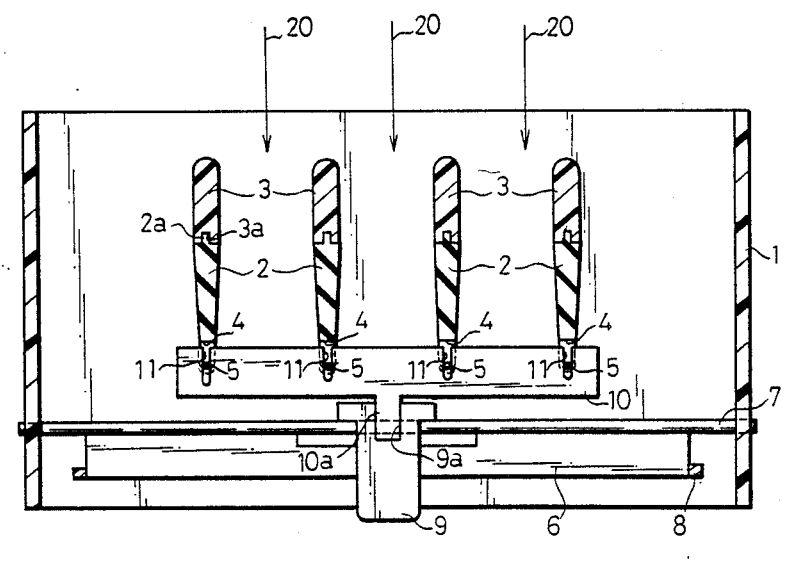

As shown in FIG. 1 and FIG. 2, a wind duct 1, serving as a main body, is made in the form of a four-sided cylinder with both ends open, with the wind 20 coming from the rear being blown forward from the front end opening. At the rear portion inside the wind duct 1, four reinforcing plates 3, which are made of a hard synthetic resin and extending from front to rear, are fixed at their upper and lower ends to the same wind duct 1. These reinforcing plates 3 are such that they are always in the same direction as that of the wind 20 coming from the rear portion of the wind duct 1. A wind deflecting plate 2 is connected to each of the reinforcing plates 3 to form one body by engagement of a protruding portion 2a at the rear end of a wind deflecting plate 2 to a recessed portion 3a on the front end of a reinforcing plate 3. These wind deflecting plates 2 have flat, smooth surfaces and are made of flexible synthetic rubber and are formed such that their cross sectional areas taken in the direction perpendicular to the direction of the wind 20 coming from the back of the wind duct 1 become thinner toward the front part of the plates. In specific terms, the wind deflecting plates 2 are 20 mm long from rear to front, 54 mm long from top to bottom, 1.6 mm thick at the rear portion, and 0.4 mm thick at the front portion. When the overall thickness is kept uniform, the rigidity at every part of the plate is the same, and, as a result, while the rear portion can be flexible, the front portion is rigid. Thus, the plates become curved at the central portion, impeding the smooth flow of the wind 20 and causing the generation of noise.

Among the materials that are used for the flexible wind deflecting plates 2 mentioned above are synthetic rubbers such as chloroprene rubber, and others, synthetic resins such as polyvinyl chloride, polypropylene, polyethylene, polyurethane, and others, and metals such as stainless steel, and others. A recessed notch 4 is provided at the front end of each wind deflecting plate 2. Engagement shafts 5, that protrude and extend from top to bottom and serve as engaging pieces, are mounted on these notches 4.

On the other hand, three wind deflecting plates 6 are provided in front of the above-mentioned wind deflecting plates 2. These wind deflecting plates 6 are not flexible and they are made of hard synthetic resin. The rear ends of these wind deflecting plates 6 are rotatably supported by the wind duct 1 through shafts 7. A linking rod 8, that links the three wind deflecting plates 6 such that they are simultaneously rotatable, is connected to the front ends of these same wind deflecting plates 6. The linking rod 8 and the abovementioned shafts 7 make up a parallel link; when the linking rod 8 is moved upward or downward, each of the three wind deflecting plates 6 rotate upward or downward about their respective shafts 7.

Figure 3:
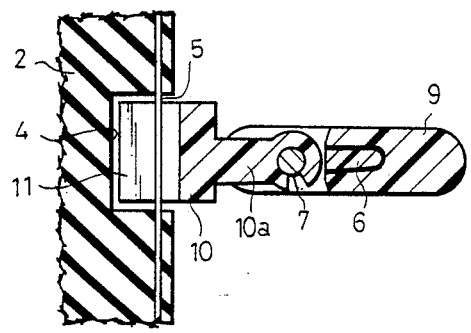

As shown in FIG. 3, an operating lever 9, serving as an operating piece, is provided at the central lateral portion of the middle wind deflecting plate 6 (among the three wind deflecting plates 6) such that it covers a portion of the aforementioned wind deflecting plate 6 and the corresponding shaft 7, and, in such state, the operating lever 9 can be slid to the left or to the right. As shown in FIG. 2, a recessed portion 9a is provided on the rear portion of the operating lever 9. A protruding portion 10a of a laterally extending guiding piece 10 is inserted into the recessed portion 9a. And, as shown in FIG. 3, the protruding portion 10a engages with the shaft 7 of the above-mentioned wind deflecting plate 6 such that the protruding portion 10a is rotatable about the shaft 7. The sliding piece 10 is such that it does not rotate when the operating lever 9 is rotated upward or downward.

As shown in FIG. 2, slits 11, that extend from front to rear and serving as long, narrow grooves, are provided at four locations on the rear end portion of the guiding piece 10. The four engagement shafts 5 provided on the front ends of the wind deflecting plates 2 are inserted into and mutually engaged with these slits 11.

When the operating lever 9 is positioned in the center along the lateral direction, the wind deflecting plates 2 become positioned such that they extend from front to rear in straight lines. During this time, the engagement shafts 5 become positioned such that they reach the innermost portions (front portions) of the slits 11. When the operating lever 9 is moved laterally, the engagement shafts 5 are moved while maintaining their engagement with the slits 11, and, at the same time, these engagement shafts 5 gradually move toward the rear portions of the slits 11. During this time, since the wind deflecting plates 2 are fixed to the reinforcing plates 3 by the engagement of the protruding portions 2a on the wind deflecting plates 2 with the recessed portions 3a of the reinforcing plates 3, the wind deflecting plates 2 become curved, between their rear end portions and the engagement shafts 5, toward a prescribed direction.

The operation of the grille for air conditioning constructed as above is described and its effects are mentioned.

First, as shown in FIG. 1 and FIG. 2, when the operating lever 9 is positioned in the center, the rear wind deflecting plates 2 are in a state where they extend, without curving, from front to rear. During this time, the engagement shafts 5 at the front end portions of the same wind deflecting plates 2 are in a state of deepest insertion inside the slits 11 provided on the guiding piece 10.

Next, when a car passenger moves the operating lever 9 from its central position to a prescribed location toward the right, since the recessed portion 9a of the operating lever 9 and the protruding portion 10a of the guiding piece 10 are in an engaged position, at the same time, the slits 11 provided on the guiding piece 10 move to the right. During this time, the engagement shafts 5 provided on the front end portions of the rear wind deflecting plates 2 move to the right while being inserted inside the slits 11 of the guiding piece 10, and, at the same time, these engagement shafts 5 move a little backward from inside the slits 11 since the rear end portions of the wind deflecting plates 2 are connected as one body with the reinforcing plates 3 fixed to the wind duct 1. Then, the wind deflecting plates 2 curve between their rear end portions and the engagement shafts 5 and form arced configurations that protrude to the left. During this time, since the rear end portions of the wind deflecting plates 2 are fixed to the reinforcing plates 3, there are forces acting on the fixture points of the wind deflecting plates 2 and the reinforcing plates 3 that work to maintain the straight configurations of the wind deflecting plates 2. Also, since the wind deflecting plates 2 are formed such that their cross sectional areas, taken in the direction perpendicular to the direction of the passing wind 20, become thinner toward the front portion of the plates, and consequently also allowing greater lateral movement at the front portions, the wind deflecting plates 2 themselves become less rigid toward their front portions. As a result, as the front end portions of the wind deflecting plates 2 are moved, these same wind deflecting plates 2 curve very smoothly in a circular arc with almost the same curvature elsewhere along the plates. Therefore, the wind 20 coming from the rear portion of the wind duct 1 flows straight forward between the four reinforcing plates 3, flows smoothly toward the right between the wind deflecting plates 2, and then flows approximately horizontally along the wind deflecting plates 6 in front of the wind deflecting plates 2, and finally blows out of the front end of the wind duct 1. Consequently, the noise generated with the passing of the wind 20 through the wind duct 1 can be satisfactorily minimized.

Next, in this state, when the operating lever 9 is moved upward, the front wind deflecting plate 6, whose central portion is covered by the operating lever 9, becomes rotated upward about the shaft 7, and since the three wind deflecting plates 6 are linked by the linking rod 8, all three wind deflecting plates 6 are rotated upward at the same time about their respective shafts 7. During this time, since the protruding portion 10a of the guiding piece 10 is rotatably supported by the shaft 7 of one of the front wind deflecting plates 6, even when the operating lever 9 is moved upward, the guiding piece 10 does not undergo rotation. Therefore, since the slits 11 of the guiding piece 10 positioned inside the notches 4 of the wind deflecting plates 2 do not undergo rotation, the vertical length of these notches 4 of the wind deflecting plates 2 can be kept short, thus making it possible to make the effective area of the wind deflecting plates 2 wider, and accurately set a prescribed angle of wind direction. In the case mentioned above, the wind 20 coming from the rear wind deflecting plates 2 flows upward through the front directing plates 6.

When the operating lever 9 is moved to the left as opposed to the case mentioned above, the wind deflecting plates 6 curve smoothly, as above, but forming a curved portion that protrudes to the right. Also, when the operating lever 9 is moved downward, the three wind deflecting plates 6 are rotated, as above, but downward. During this time, since the guiding piece 10 and the slits 11 do not undergo rotation even when the operating lever 9 is rotated, as before, the notches 4 on the rear wind deflecting plates 2 can be made small, a wider effective area for the wind deflecting plates 2 can be realized, and the angle of wind direction can be set accurately. In this case, the wind 20 coming from the rear portion of the wind duct 1 flows smoothly toward the left while passing through the rear wind deflecting plates 2, flows downward while passing through the front wind deflecting plates 6, and finally blows out of the front end of the wind duct 1.

As described above, the grille for air conditioning of the present embodiment was constructed to have engagement shafts 5 that engage with the notches 4 on the front end portions of the wind deflecting plates 2 provided at the rear portion inside the wind duct 1, and an operating lever 9 and a guiding piece 10 that are separate from each other, the protruding portion 10a of the guiding piece 10 being inserted into the recessed portion 9a of the operating lever 9 with the protruding portion 10a of the guiding piece 10 being rotatably supported by the shaft 7 of one of the front wind deflecting plates 6. With this construction, it becomes possible to sufficiently make the effective area of the rear wind deflecting plates 2 wider, and, with only a slight operating force, improve such other properties as wind direction, and others, without the wind deflecting plates 2 becoming twisted or warped.

Also, since the wind deflecting plates 2 were formed such that they become thinner toward the front portions of the plates, these wind deflecting plates 2 curve smoothly, allowing the wind 20 to flow very smoothly through them. Further, since the rear portions of the wind deflecting plates 2 are connected to the rigid reinforcing plates 3 such that they each form one unit, the rear end portions of the wind deflecting plates 2 become securely supported, and the flow of the wind 20 coming from the rear portion of the wind duct 1 is made smooth as it flows toward the wind deflecting plates 2.

Further, since a wind deflecting plate 2 and a reinforcing plate 3 are formed as one body by a simple engagement of the rear portion of the wind deflecting plate 2 with the reinforcing plate, the process of assembling the invention becomes simplified, the overall strength of the wind reinforcing plates is improved, and the manufacturing cost is minimized.

[Second Embodiment]

Figure 4:
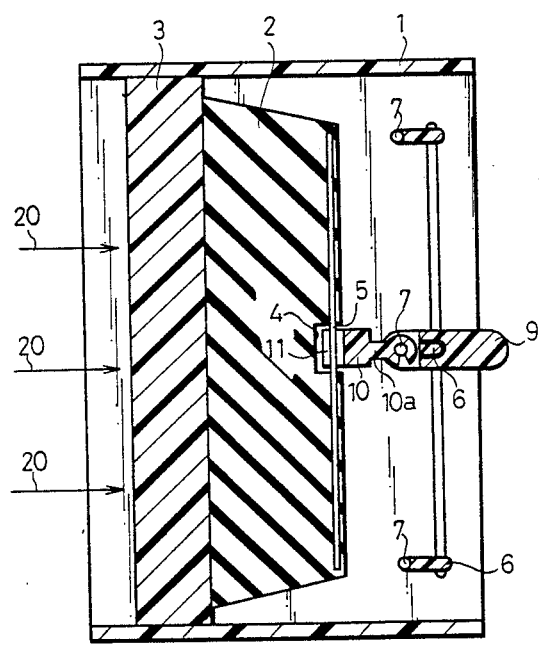
FIG. 4 is an illustration showing the second embodiment; it is a side sectional view of a grille for air conditioning.

As shown in FIG.4, in the present embodiment, as opposed to the first embodiment, the overall thickness of the wind deflecting plates 2 is kept constant, and, to make the cross sectional area of the wind deflecting plates 2, taken in the direction perpendicular to the direction of the wind 20 coming from the rear portion of the wind duct 1, smaller toward the front portions of the plates, the plates are formed such that their vertical lengths become shorter toward the front portions of the plates. Other aspects of the present embodiment are the same as those of the first embodiment.

By constructing the present embodiment in the manner described above, as in the first embodiment, the wind deflecting plates 2 curve very smoothly, and smoothly change the direction of the wind 20 coming from the rear portion of the wind duct 1 and lead the wind 20 to be blown from the front end of the wind duct 1.

The present embodiment operates in the same manner as the first embodiment and likewise exhibits the same effects.

[Third Embodiment]

Next, another embodiment exemplifying the grille for air conditioning of the present invention, which is also mounted on the installation panel provided in the interior of an automobile is described with reference to FIG. 5 to FIG. 7.

Figure 5:
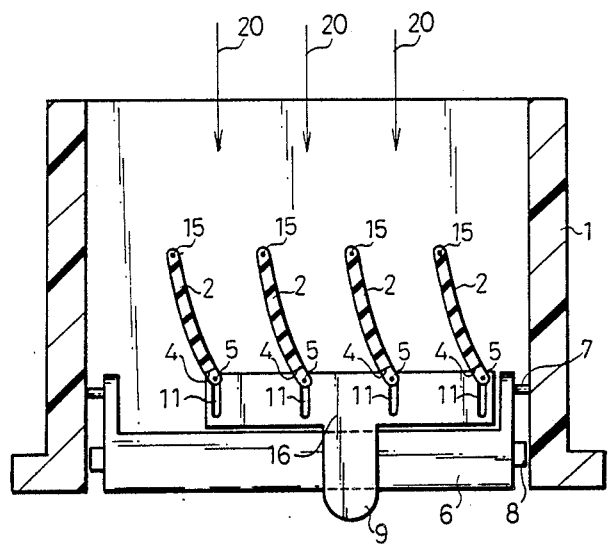
FIG. 5 to FIG. 7 are illustrations showing the third embodiment.
Figure 6:
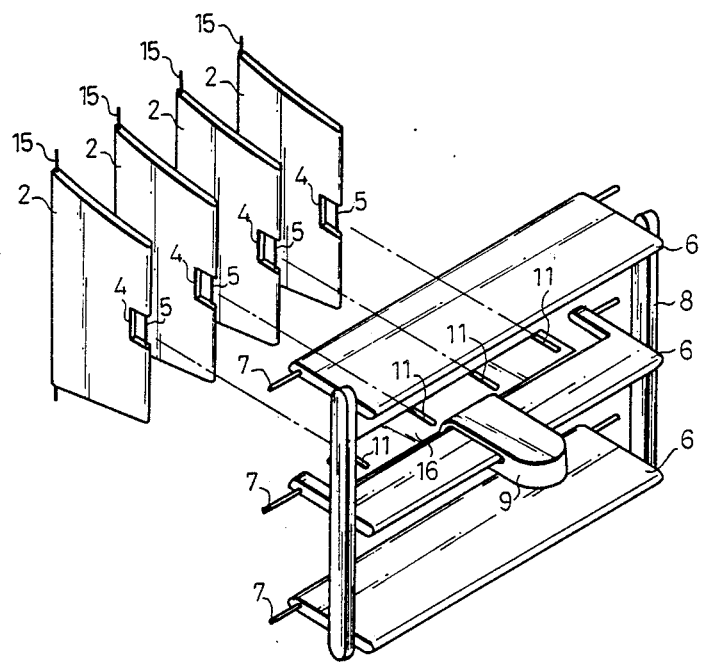
Figure 7:
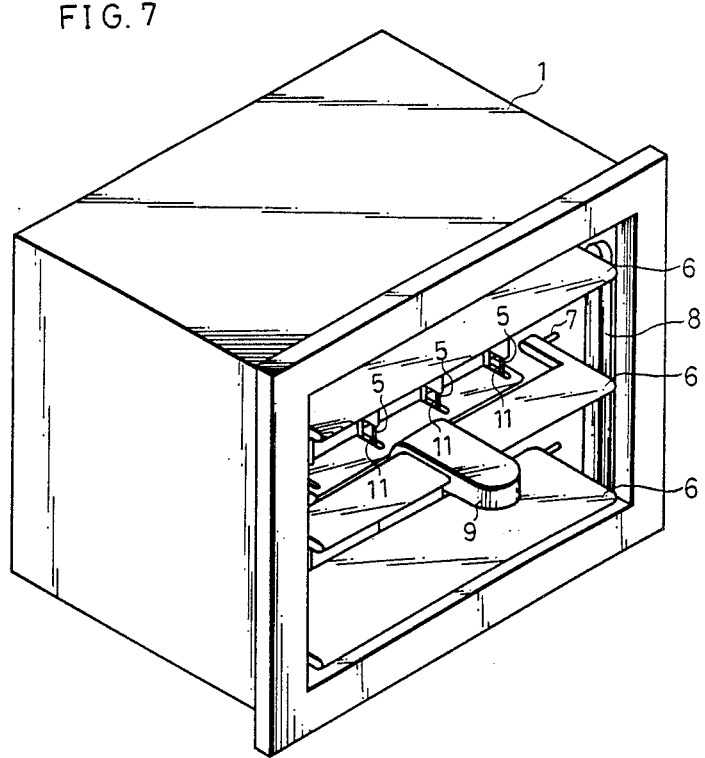

As shown in FIG. 5 to FIG. 7, four flexible wind deflecting plates 2 made of synthetic rubber are provided at approximately equal intervals and fixed to non-rotatable shafts 15, whose upper and lower ends are fixed to the wind duct 1. The wind duct 1, serving as a main body, has the form of a four-sided cylinder with open ends. The wind deflecting plates 2 are provided at the approximately central portion of the wind duct 1. The rear end portions of the wind deflecting plates 2 are such that they are always in the same direction as that of the wind 20 coming from the back of the wind duct 1. Also, as shown in FIG. 6, the vertical lengths of these same wind deflecting plates 2 are such that they become shorter toward the front portions of the plates. When the front end portions of these wind deflecting plates 2 are moved to the left or to the right in order to cause the wind deflecting plates 2 to curve, these wind deflecting plates 2 are such that they are smoothly.

The materials that can be used for the flexible wind deflecting plates 2 are the same as those given in the first embodiment. A notch 4 is formed at the front end portions of the wind deflecting plates 2, the front end of these notches being provided with an exposed engagement shaft 5 that extends vertically.

On the other hand, three non-flexible wind deflecting plates 6 made of hard synthetic resin are provided horizontally in front of the wind deflecting plates 2 mentioned above. The rear end portions of these wind deflecting plates 6 are supported by rotary shafts 7, which are connected to the wind duct 1. A linking rod 8 is provided at the front ends of the wind deflecting plates 6 and it serves to link all three wind deflecting plates 6 such that they are simultaneously rotatable. This linking rod 8 and the above-mentioned shafts 7 make up a parallel link. When the linking rod 8 is moved upward or downward, the three wind deflecting plates 6 are made to rotate about their respective shafts 7 to face upward or downward.

An operating lever 9, serving as an operating piece, is provided, and it covers the middle portion of the middle wind deflecting plate 6, among the three wind deflecting plates 6. This operating lever 9 is such that it is capable of being slid to the left or to the right. The rear portion of this operating lever 9 forms a horizontally extending supporting piece 16 that moves as one body with the operating lever 9. Slits 11, in the form of long, narrow grooves extending from front to rear, are provided at four locations on the supporting piece 16. As shown in FIG. 6, the four engagement shafts 5 provided on the front end portions of the wind deflecting plates 2 become inserted into these slits 11 and they become mutually engaged.

When the operating lever 9 is in the middle horizontal position, the wind deflecting plates 2 are in a state where they extend in straight lines from front to rear, and the engagement shafts 5 are inserted up to the innermost portions (front portions) of the slits 11. Then, when the operating lever 9 is moved to the left or to the right, the engagement shafts 5 move while maintaining their engagement with the slits 11, and these engagement shafts 5 move gradually away from the innermost portions of the slits 11. During this time, since the rear end portions of the wind deflecting plates 2 are fixed to the shafts 15, the wind deflecting plates 2 become curved.

The rear end portion of the front wind deflecting plate 6 positioned in the middle (among the three front wind deflecting plates 6) rotates about a line corresponding to the shaft 7, that lies along the notches 4 at the front end portions of the rear wind deflecting plates 2. In order to keep the vertical width of the notches 4 at a minimum, the structure is such that the corresponding front to rear position of the shaft 7 is located approximately at the center of the notches 4.

The operation of the grille for air conditioning constructed as above is described and its effects are mentioned.

First, as shown in FIG. 6 and FIG. 7, in a state wherein the operating lever 9 is located in the central position, the rear wind deflecting plates 2 maintain a straight configuration and they extend from front to rear. During this time, the engagement shafts 5 at the front ends of the wind deflecting plates 2 are inserted up to the innermost portion of the slits 11 that are provided on the supporting piece 16.

Next, as shown in FIG. 5, when the operating lever 9 is moved from its central position toward a prescribed position to the right, at the same time, the slits 11 are also translated to the right. When this happens, the engagement shafts 5 provided on the front end portions of the rear wind deflecting plates 2 are moved to the right while maintaining their engagement with the slits 11 of the operating lever 9, and, at the same time, since the rear portions of the wind deflecting plates 2 are fixed to the shafts 15 supported by the wind duct 1, the engagement shafts 15 are moved toward the rear portion of the slits 11. Then, since the wind deflecting plates 2 are formed such that their vertical lengths become shorter toward the front portions of the plates, the part of the wind deflecting plates 2 between the shafts 15 and the engagement shafts 5 curve smoothly, forming an arced shape protruding toward the left.

Therefore, the wind 20 coming from the rear portion of the wind duct 1 passes through the wind deflecting plates 2 and flows smoothly toward the right, then flows through the front wind deflecting plates 6 in an approximately horizontal direction, and finally blows out of the front end of the wind duct 1.

Next, from this state, when the operating lever 9 is moved upward, the front wind deflecting plate 6 whose middle portion is covered by the operating lever 9 rotate upward about the shaft 7, and, at the same time, since all three wind deflecting plates 6 are linked by the linking rod 8, they all rotate upward about their respective shafts 7. As a result, the wind 20 coming from the rear wind deflecting plates 2 flows upward through the front wind deflecting plates 6.

When the operating lever 9 is moved to the left as opposed to the preceding case, as before, the wind deflecting plates 6 curve to form an arced shape, this time protruding toward the right. Also, when the operating lever 9 is moved downward, as before, the three wind deflecting plates 6 rotate downward. As a result, the wind 20 coming from the rear portion of the wind duct 1 passes through the wind deflecting plates 2 and flows smoothly toward the left, then flows downward through the front wind deflecting plates 6, and finally blows out of the front end of the wind duct 1.

As mentioned above, since the grille for air conditioning of the present embodiment is constructed so as not to require the use of gears, cams, and others by providing engagement shafts 5 on the notches 4 at the front end portions of the wind deflecting plates 2 provided on the inner rear portion of the wind duct 1, and providing slits 11 on the supporting piece 16 provided on the rear portion of the operating lever 9, the number of parts required is small, the structure is simple, and the process of assembling the various above-mentioned parts becomes simplified. Also, since the flexible wind deflecting plates 2 are formed such that their vertical lengths become small toward the front portions of the plates, they possess the property of curving in a very smooth manner, allowing the wind 20 passing through the wind duct 1 to flow in a prescribed direction without generating noise. Further, as a result of the simplified structure, the production cost is also minimized.

Since the rear end portions of the rear wind deflecting plates 2 are in the same direction as that of the wind 20 being introduced from the rear, the generation of noise is minimized, specially when a strong wind is being blown. Also, since the angles of the rear wind deflecting plate 2 and front wind deflecting plates 6 can be changed appropriately by the operation of just one operating lever 9, the wind 20 can be easily made to blow in a desired direction.

[Fourth Embodiment]

In the present embodiment, an embodiment exemplifying a grille for air conditioning that is likewise mounted on an installation panel provided in the interior of an automobile is described with reference to FIG. 8. The grille for air conditioning of the present embodiment employs the so-called barrel-type structure shown in FIG. 8.

Figure 8:
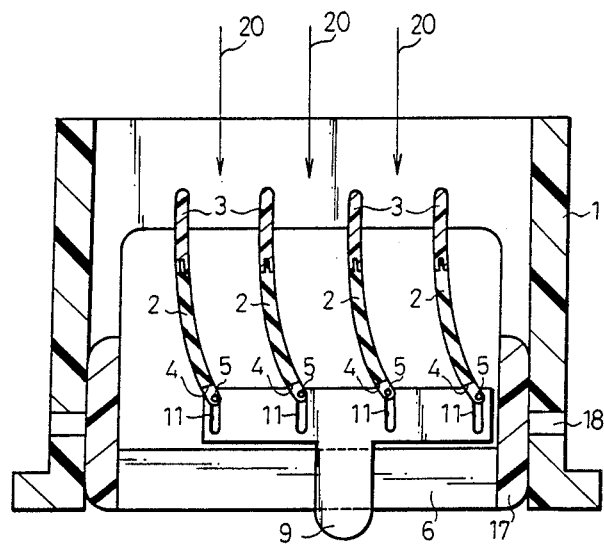
FIG. 8 is an illustration showing the fourth embodiment; it is a plane sectional view showing the wind deflecting plates in their curved state.

As shown in FIG. 8, non-flexible wind deflecting plates 6 and an inner case 17, formed integrally with these wind deflecting plates 6 and serving as a main body, are provided inside the wind duct 1, the inner case 17 being rotatably supported by the wind duct 1 by means of a shaft 18. Also, the reinforcing plates 3 are fixed at their upper and lower ends to the inner case 17. The front end portions of the reinforcing plates 3 and the rear end portions of the wind deflecting plates 2 are connected, each forming an integral body. The same structure used in the first embodiment, wherein a recessed portion and a protruding portion are made to engage is also used here. Also, the operating lever 9 is constructed in the same manner as in the third embodiment, and the wind deflecting plates 2 are formed in the same manner as in the second embodiment.

Also, in this barrel-type grille for air conditioning, the process of making the rear wind deflecting plates 2 bend to the right or to the left is accomplished in the same manner as in the first embodiment. Also, the upward or downward rotation of the front wind deflecting plates 6 is done by moving the operating lever 9 upward or downward, making the inner case 17 rotate correspondingly about the shaft 18. By being constructed in the manner described, the present embodiment can be operated in the same way as the third embodiment, and the same advantages are exhibited.

The present invention is not limited to the first to fourth embodiments mentioned above, and it may be modified in various ways without departing from its spirit and scope. For example, the following constructions can be realized:

(1) In the grille for air conditioning of the present invention, since the non-flexible wind deflecting plates 6 are provided to be perpendicular to the flexible wind deflecting plates 2, alternatively, the rear wind deflecting plates 2 may be installed horizontally, with the front wind deflecting plates 6 being installed vertically. Also, the total number of each set of wind deflecting plates 2, 6 may be set appropriately.

(2) The operating lever 9 may be placed on the uppermost or lowermost wind deflecting plate 6, and the engagement shafts 5 mounted into the notches 4 may be provided on the front end portions of the rear wind deflecting plates 2 at the locations corresponding to the slits 11 on the aforementioned (uppermost or lowermost) front wind deflecting plate 6.

(3) Aside from the air conditioners mounted on the installation panel of an automobile, the grille for air conditioning of the present invention may also be used in home heaters and air conditioners.

As many apparently widely different embodiments of this invention may be made without departing from the spirit and scope thereof, it is to be understood that the invention is not limited to the specific embodiments thereof except as defined in the appended claims.

What is claimed is:

1. A grille for air conditioning comprising:

a main body portion having an opening for blowing out a wind;

a plurality of reinforcing plates each said plate having a longitudinal axis, a proximal edge located at a downstream side of the wind and a distal edge located at an upstream side of the wind, said reinforcing plates being connected at each longitudinal end thereof between opposing walls of said main body portion so that said reinforcing plates are disposed in parallel spaced relation, said reinforcing plates being disposed so that the edges thereof extend in a substantially intersecting direction with a blowing direction of the wind;

a plurality of flexible wind deflecting plates, each said flexible wind deflecting plate having a longitudinal axis, a proximal edge located at a downstream side of the wind and a distal edge located at an upstream side of the wind, said distal edge of each said flexible wind deflecting plate being connected to the proximal edge of a respective said reinforcing plate so that the longitudinal axis of each said flexible wind deflecting plate is substantially parallel to the longitudinal axis of said respective reinforcing plates;

a plurality of front wind deflecting plates mounted to said main body so as to be disposed downstream of said flexible wind deflecting plates, each said wind deflecting plate having a longitudinal axis disposed substantially perpendicular to said longitudinal axis of said flexible deflecting plates; and an operating piece slidably supported by one of said front wind deflecting plates, said operating piece having an upstream portion and a downstream portion, said upstream portion of said operating piece having grooves defined therein, each said groove engaging a center of said downstream edge of a said flexible wind deflecting plate, the engaged portions of said flexible wind deflecting plates being movable within said grooves.

2. A grille for air conditioning, as set forth in claim 1, wherein the front wind deflecting plates are rigid plates, which are rotatably supported at their rear ends by shafts supported by said main body.

3. A grille for air conditioning, as set forth in claim 2, wherein the flexible wind deflecting plates are formed from an elastomeric material, recessed notches are formed on the front ends of the flexible wind deflecting plates, the front end of each said notch being provided with a shaft that engages with a respective said groove in said operating piece, said shafts being inserted in the front end portions along the entire length of said flexible wind deflecting plates.

4. A grille for air conditioning, as set forth in claim 2, wherein said reinforcing plates each have a groove defined therein and the rear end portions of said flexible wind deflecting plates each having an insertion portion sized so as to be receivable in a said groove of a respective reinforcing plate so that said reinforcing plates are connected to said flexible wind deflecting plates by an insert and lock structure.

5. A grille for air conditioning, as set forth in claim 2, wherein the flexible wind deflecting plates are formed such that their cross sectional areas, taken in the direction perpendicular to the direction of the wind coming from the rear portion of said main body, become smaller toward the front portions of the plates.

6. A grille for air conditioning, as set forth in claim 5, wherein the flexible wind deflecting plates are formed such that their thickness becomes smaller toward the front of the plate.

7. A grille for air conditioning, as set forth in claim 5, wherein the flexible wind deflecting plates are formed such that their vertical length becomes smaller toward the front of the plate.

8. A grille for air conditioning, as set forth in claim 1, wherein said main body is supported inside a wind duct such that it is rotatable.

9. A grille for air conditioning, as set forth in claim 8, wherein the flexible wind deflecting plates are formed from an elastomeric material, recessed notches are formed on the front ends of the flexible wind deflecting plates, the front end portions thereof being mounted with engagement pieces that engage with said grooves in said operating piece.

10. A grille for air conditioning, as set forth in claim 8, wherein said reinforcing plates each have a groove defined therein and the rear end portions of said flexible wind deflecting plates each having an insertion portion sized so as to be receivable in a said groove of a respective reinforcing plate so that said reinforcing plates are connected to said flexible wind deflecting plates to form single units by an insert and lock structure.

11. A grille for air conditioning, as set forth in claim 8, wherein the flexible wind deflecting plates are formed such that their cross sectional areas, taken in the direction perpendicular to the direction of flow of the wind coming from the rear portion of the main body, become smaller toward the front ends of the plates.

12. A grille for air conditioning, as set forth in claim 11, wherein the flexible wind deflecting plates are formed such that their lengths become shorter toward the front ends of the plates.

13. A grille for air conditioning as set forth in claim 2, wherein said operating piece has an operating lever, said operating lever being slidably supported on the front wind deflecting plate and a guiding piece slidably connected and rotatably mounted to said shaft of said front wind deflecting plate and having said grooves, said guiding piece being guided by said operating lever.

* * * * *